US009135195B2

(12) United States Patent
Gupta et al.

(10) Patent No.: US 9,135,195 B2
(45) Date of Patent: Sep. 15, 2015

(54) PREDICTION OF ELECTRONIC COMPONENT BEHAVIOR IN BUS-BASED SYSTEMS

(75) Inventors: Aseem Gupta, Austin, TX (US); Magdy Samuel Abadir, Austin, TX (US)

(73) Assignee: FREESCASLE SEMICONDUCTOR, INC., Austin, TX (US)

( * ) Notice: Subject to any disclaimer, the term of this patent is extended or adjusted under 35 U.S.C. 154(b) by 448 days.

(21) Appl. No.: 13/556,257

(22) Filed: Jul. 24, 2012

(65) Prior Publication Data

US 2014/0032803 A1 Jan. 30, 2014

(51) Int. Cl.
*G06F 13/36* (2006.01)
*G06F 13/362* (2006.01)
*G06F 13/364* (2006.01)

(52) U.S. Cl.
CPC ............ *G06F 13/362* (2013.01); *G06F 13/364* (2013.01)

(58) Field of Classification Search
USPC ........... 710/107–125, 240–244; 713/300–340
See application file for complete search history.

(56) References Cited

U.S. PATENT DOCUMENTS

| 5,574,868 | A | 11/1996 | Marisetty | |
|---|---|---|---|---|
| 6,941,428 | B2 * | 9/2005 | Carr | 711/158 |
| 7,152,102 | B2 * | 12/2006 | Brinton et al. | 709/223 |
| 7,263,566 | B2 * | 8/2007 | Ganasan et al. | 710/118 |
| 7,552,268 | B2 | 6/2009 | Moore | |
| 7,606,957 | B2 * | 10/2009 | Furuzono | 710/244 |
| 7,721,011 | B1 * | 5/2010 | Sutera | 710/6 |
| 7,778,937 | B2 * | 8/2010 | Ferrara et al. | 705/304 |
| 7,802,039 | B2 * | 9/2010 | Morita | 710/117 |
| 7,861,042 | B2 * | 12/2010 | Larson et al. | 711/152 |
| 7,882,292 | B1 * | 2/2011 | Van Dyke et al. | 710/244 |
| 8,032,678 | B2 * | 10/2011 | Tardieux et al. | 710/113 |
| 8,456,988 | B2 * | 6/2013 | Yang et al. | 370/230 |
| 8,539,129 | B2 * | 9/2013 | Wang | 710/244 |
| 8,675,861 | B2 * | 3/2014 | Matteo et al. | 379/266.06 |
| 8,694,015 | B2 * | 4/2014 | Hsiao | 455/452.1 |
| 8,830,716 | B2 * | 9/2014 | Feekes | 365/63 |
| 8,831,963 | B2 * | 9/2014 | Backer et al. | 705/5 |
| 2011/0258353 | A1 | 10/2011 | Wang | |

OTHER PUBLICATIONS

Walcott et al., Dynamic Prediction of Architectural Vulnerability from Microarchitectural State, International Symposium on Computer Architecture (ISCA), Jun. 9-13, 2007, USA.
Sarikaya et al., A Unified Prediction Method for Predicting Program Behavior, IEEE Transactions of Computers, vol. 59, No. 2, Feb. 2010, USA.

* cited by examiner

*Primary Examiner* — Brian Misiura

(57) ABSTRACT

Systems and methods for predicting electronic component behavior in bus-based systems are described. In some embodiments, a method may include identifying a first bus access request pending in a request queue, the first bus access request associated with a first master component operably coupled to a bus. The method may also include calculating a first wait time corresponding to the first bus access request, the first wait time indicative of a length of time after which the first master component is expected to be granted access to the bus. The method may further include, in response to the first wait time meeting a threshold value, issuing a command to the first master component. In some embodiments, various techniques disclosed herein may be implemented, for example, in a computer system, an integrated circuit, or the like.

17 Claims, 4 Drawing Sheets

300

400

PREDICTION OF ELECTRONIC COMPONENT BEHAVIOR IN BUS-BASED SYSTEMS

FIELD

This disclosure relates generally to electronics, and more specifically, to systems and methods of predicting electronic component behavior in bus-based systems.

BACKGROUND

Electronic components often communicate with each other over a communication bus. For example, a system-level bus (e.g., Peripheral Component Interconnect Express, etc.) may allow discrete hardware devices or components (e.g., a Central Processing Unit, a Graphics Processing Unit, a memory, etc.) to be coupled to one another within a computer system or the like. Meanwhile, a chip-level bus (e.g., Advanced Microcontroller Bus Architecture®, etc.) may be used to enable communications among processing cores and other components within a single integrated circuit (e.g., a System-on-Chip, an Application-Specific Integrated Circuit, etc.).

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Embodiments disclosed herein are directed to systems and methods for predicting electronic component behavior in bus-based systems. In some implementations, these systems and methods may be particularly well suited for deployment in integrated circuits such as, for example, System-on-Chip (SoC) circuits, Application Specific Integrated Circuits (ASICs), Digital Signal Processors (DSPs), processors, microprocessors, controllers, microcontrollers (MCUs), etc. It should be understood, however, that some of the examples described below make reference to integrated circuits for sake of illustration only. More generally, the same or similar techniques may find applicability in various other types of systems (e.g., computer systems, etc.) having two or more master components, devices, or circuits, whether integrated or discrete, that share a bus or the like in order to communicate with one or more slave components, devices, or circuits.

Figure 1:
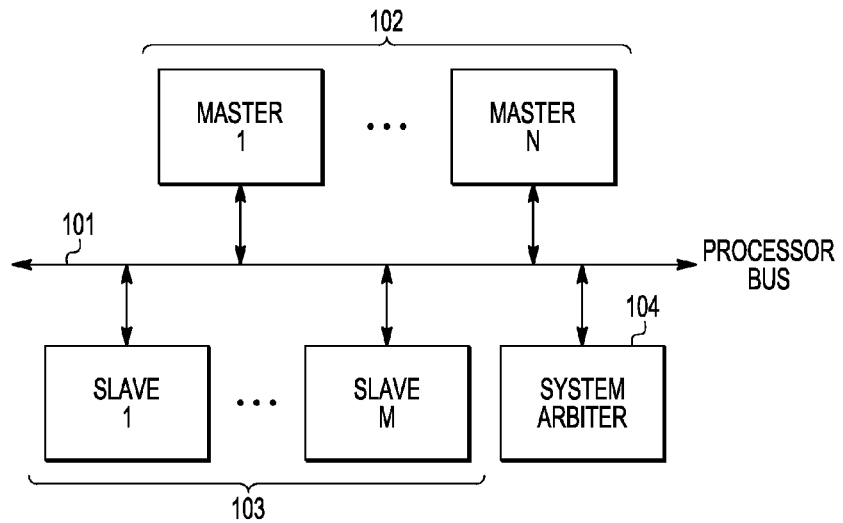
FIG. 1 is a block diagram of electronic components operably coupled to each other via a bus-based system, according to some embodiments.

Turning to FIG. 1, a block diagram of electronic components operably coupled via bus-based system 100 is depicted according to some embodiments. As illustrated, one or more master components 102 are operably coupled to one or more slave components 103 via bus 101. As such, bus 101 may be used to couple master and slave components 102 and 103 together, for example, to share data or perform other data processing operations. At any given time bus 101 may allow data transfers between two electronic components (e.g., between master 1 and slave m). Accordingly, in order to manage communications over bus 101, system arbiter 104 may be operably coupled to or otherwise integrated into bus 101, and it may be configured to receive all data transfer or bus access requests (e.g., read or write instructions) from all of master components 102. System arbiter 104 may be further configured to store these data transfer or bus access requests, resolve any deadlocks (e.g., if two or more requests arrive at system arbiter 104 at the same time), and assign bus 101 to one of the data transfer or bus access requests at a time in an orderly fashion.

In some implementations, system 100 may be part of integrated circuit including, but not limited to, ASICs, SoCs, DSPs, processors, microprocessors, controllers, MCUs, or the like. For example, master components 102 may be different processing cores and slave components 103 may be memory circuits (e.g., Static Random Access Memory (SRAM), Magnetoresistive RAM (MRAM), Nonvolatile RAM (NVRAM, such as "flash" memory), Dynamic RAM (DRAM), read only memory (ROM), erasable ROM (EROM), erasable programmable ROM (EPROM), electrically erasable programmable ROM (EEPROM), etc.) within the same chip. Slave components 103 may also include communication modules or controllers (e.g., Universal Serial Bus (USB), Controller Area Networks (CAN), IEEE 802.11, etc.), sensor or actuators controllers or interfaces, other "Intellectual Property" or IP cores, other peripherals, etc., still within the same chip. Accordingly, bus 101 may implement any suitable bus architecture, including, for instance, Advanced Microcontroller Bus Architecture® (AMBA®), CoreConnect™ bus architecture (CCBA™), etc. Additionally or alternatively, bus 101 may include, for example, a cross switch, crossbar switch, or the like.

In other implementations, system 100 may be a part of a computer system or the like. As such, master components 102 may be different processors (e.g., Central Processing Units or "CPUs," Graphics Processing Unit or "GPUs," etc.) and slave components 103 may be memory devices (e.g., via single inline memory modules (SIMMs), dual inline memory modules (DIMMs), etc.), peripheral devices or controllers, etc. In some cases, these various devices or circuits may be operably coupled to each other, for example, via one or more printed circuit boards (PCBs) or the like. In such cases, bus 101 may implement a suitable bus architecture such as, for example, Peripheral Component Interconnect (PCI), PCI Express (PCIe), Small Computer System Interface (SCSI), etc. In yet other implementations, system 100 may include two or more chips within a same package.

Still referring to FIG. 1, each data transfer or bus access request arriving at arbiter system 101 may include one or more of the following: an identification of the master component issuing the request (Master_ID), a "priority code" associated with the master component, an identification of the slave component targeted by the request (Slave_ID), and an indication of the amount of data requested or magnitude of the request (e.g., in number of bytes). As described in more detail below, when a high priority request is being serviced by bus 101, system arbiter 104 may store lower priority requests in a pending queue. In some implementations, the pending queue may be capable of holding between 4 and 64 entries, although any number of bus access requests may be stored depending upon the queue's design. Typically, if multiple requests of the same priority arrive at system arbiter 104, system arbiter 104 may service them in a round robin fashion or using another suitable algorithm.

Figure 2:
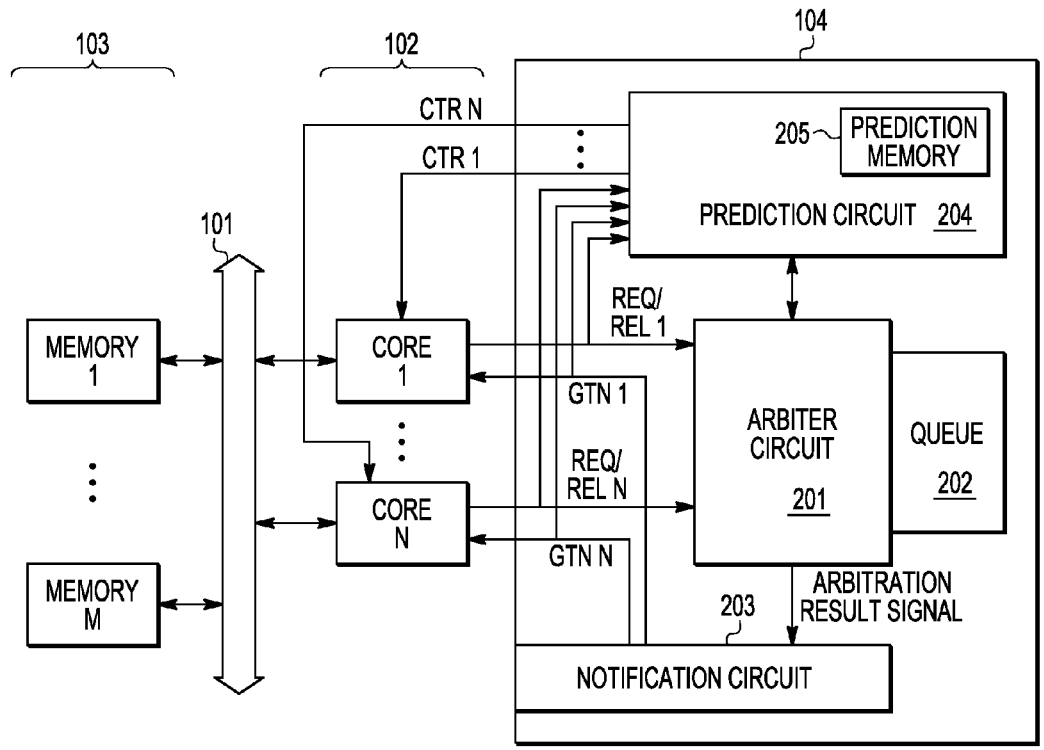
FIG. 2 is a block diagram of a System-on-Chip (SoC) as an example of a bus-based system, according to some embodiments.

FIG. 2 is a block diagram of SoC 200 as an example of bus-based system 100 according to some embodiments. As illustrated, bus 100 enables processing cores 102 (i.e., master components 102 in FIG. 1) to communicate with memory circuits 103 (i.e., slave components 103 in FIG. 1) via bus 101 under control of system arbiter 104. Specifically, cores 102 may each be configured to provide a bus access request signal ($REQ_{1-n}$) and/or a release signal ($REL_{1-n}$) to arbiter circuit 201. Arbiter circuit 201 may include or be operably coupled to request queue 202, where one or more bus access requests originated by cores 102 may be stored. Arbiter circuit 201 may also be configured to provide arbitration result signals to notification circuit 203, and notification circuit 203 may be configured to provide bus grant signals ($GNT_{1-n}$) to cores 102.

Specifically, arbiter circuit 201 may receive data transfer or bus access requests from cores 102 via their respective REQ signals. Arbiter circuit 201 may then examine those requests and store them in queue 202, for example, by order of priority. For instance, if a first core has a higher priority than a second core, then a first bus access request issued by the first core may be stored higher within queue 202 than a second request issued by the second core, even if the second request has arrived at arbiter circuit 201 before the first request (i.e., the second request has already been placed in queue 202). Arbiter circuit 201 may then grant the bus access request at the top of queue 202 (i.e., the request with highest priority) to a corresponding one of cores 102 by sending an arbitration result signal to notification circuit 203, which may then issue one of grant signals GNT to the respective core. When a request is fulfilled (or otherwise terminates), the core making use of bus 101 may transmit a corresponding REL signal to arbiter circuit 201 in order to release bus 101. In response to the REL signal, arbiter circuit 201 may grant the next data transfer or bus access request at the top of queue 202 via the arbitration result signal to notification circuit 203, and the process may be repeated so long as other bus access requests remain pending in queue 202.

To implement certain component prediction techniques, prediction circuit 204 may also receive $REQ_{1-n}$, $GNT_{1-n}$, and $REL_{1-n}$ signals. Additionally or alternatively, prediction circuit 204 may be operably coupled to arbiter circuit 201 and/or request queue 202. As such, prediction circuit 204 may be configured to reproduce at least a portion of queue 202 in prediction memory 205. Moreover, prediction circuit 204 may be further configured to provide a message or control signal ($CTR_{1-n}$) to cores 102. In some embodiments, prediction circuit 204 may predict the behavior of one or more cores 102 operably coupled to bus 101 based, at least in part, upon pending queue 202 and/or prediction memory 205. For example, prediction circuit 204 may analyze pending bus access requests and use that information to determine which of cores 102 is/are waiting to obtain access to bus 101, and are therefore "stalled" or "idle." Prediction circuit 204 may also calculate or otherwise estimate "wait times" for one or more bus access requests, and send a message or control signal to a corresponding one of cores 102. Such a message may, in some cases, indicate the expected wait time for a given one of cores 102 such that the given core may take a power saving or performance enhancing action (e.g., temporarily switch its own operation to a "sleep mode" or the like). Additionally or alternatively, the message may contain power saving or performance enhancing instructions directed at the given master component (e.g., directing a master component to enter in a selected one of a plurality of different power modes, etc.). These, and other operations, are discussed in FIGS. 3-5 below.

In some embodiments, the modules or blocks shown in FIG. 2 may represent processing circuitry and/or sets of software routines, logic functions, and/or data structures that, when executed by the processing circuitry, perform specified operations. Although these modules are shown as distinct logical blocks, in other embodiments at least some of the operations performed by these modules may be combined in to fewer blocks. For example, in some cases, prediction circuit 204 may be combined, at least in part, with arbiter circuit 201. Conversely, any given one of blocks 201-205 may be implemented such that its operations are divided among two or more logical blocks. Although shown with a particular configuration, in other embodiments these various modules or blocks may be rearranged in other suitable ways.

Figure 3:
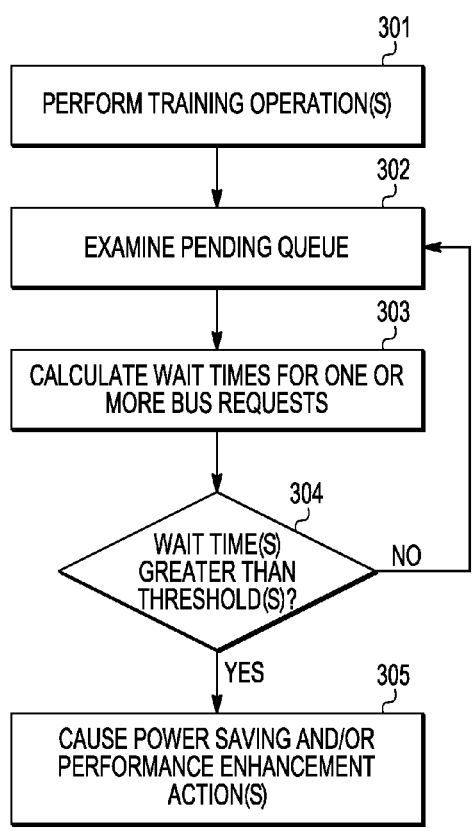
FIG. 3 is a flowchart of a method of predicting component behavior, according to some embodiments.

FIG. 3 is a flowchart of method 300 of predicting component behavior. In some embodiments, method 300 may be performed, at least in part, by prediction circuit 204 of system arbiter 104 shown in FIG. 2. As illustrated, method 300 performs a training operation at block 301. Such a training operation may be used, for example, to enable prediction circuit 204 to calculate a service time (ST) for a pending bus access request—i.e., an amount of time that the pending request is expected to take to complete once initiated, and during which bus 101 may be busy or otherwise unavailable to other components. An example of such a training operation is discussed in FIG. 4. At block 302, method 300 examines pending queue 202. Additionally or alternatively, method 300 may inspect prediction memory 205 and/or receive a copy of one or more incoming bus access requests.

At block 303, method 300 calculates wait times for one or more bus access requests, for example, based at least in part upon the STs of higher priority bus access requests. Techniques suitable for performing wait time calculations are provided in FIG. 5. Generally speaking, a wait time is the length of time that a given bus access request is expected to have to wait before it reaches the top of queue 202 or is otherwise granted by arbiter circuit 201. In many situations, during a bus access request's wait time, the corresponding one of cores 102 that issued that request is generally idle. At block 304, method 300 determines whether a calculated wait time is grater than a predetermined threshold (e.g., in microseconds, milliseconds, number of clock cycles, etc.). If not, then it may not be efficient to perform a "power down" operation or the like (which may take many clock cycles to complete), and control returns to block 302. Otherwise, at block 305, method 300 causes power saving or performance enhancement action(s) to be taken by one of cores 102.

Figure 4:
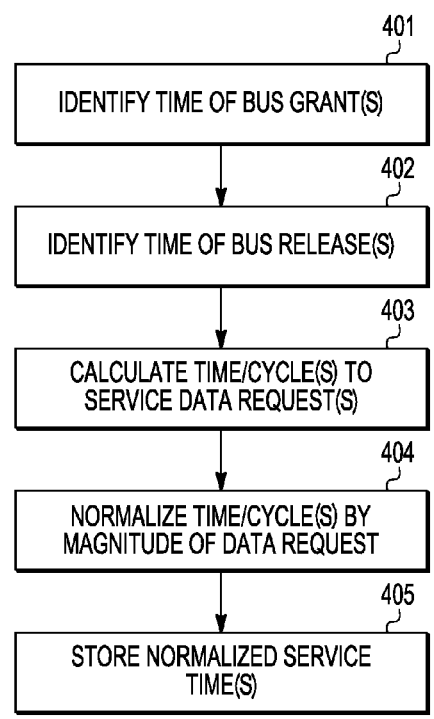
FIG. 4 is a flowchart of a training method suitable for calculating normalized service times, according to some embodiments.

FIG. 4 is a flowchart of training method 400 suitable for calculating normalized service times. In some embodiments, method 400 may be performed, at least in part, by prediction circuit 204 of system arbiter 104 shown in FIG. 2 and as part of block 301 in FIG. 3. As illustrated, method 400 identifies a time of a bus grant for a given one of a plurality of bus access requests at block 401. For example, prediction circuit 204 may identify a bus access request at or near the top of queue 202, and it may receive a GNT signal from notification circuit 203 upon grant of bus 101 to that request. At block 402, method 400 identifies a time of release of bus 101. For example, prediction circuit 204 may receive a REL signal from the core that previously had access to bus 101.

At block 403, method 400 calculates an amount of time or number of clock cycles that it took for the request to be completed—i.e., the request's ST or service time ($ST=T_{GNT}-T_{REL}$). At block 404, method 400 calculates a normalized ST for the request. For example, prediction circuit 204 may divide the request's ST by a magnitude or size of the request (e.g., in number of bytes) to obtain a normalized ST value in units of "number of cycles/byte," "seconds/byte," or the like. Then, at block 405, method 400 may store the normalized ST associated with that request. For example, prediction circuit 204 may store the normalized ST value in a look-up table within prediction memory 205.

In some embodiments, method 400 may be performed such that a normalized service time is stored for a specific pair of core 102 and memory 103. For example, during a training phase (e.g., 1 second, 30 seconds, 1 minute, 5 minutes, etc.), every time a bus access request arrives at queue 202, prediction circuit 204 may determine whether a new combination of Master_ID and Slave_ID is about to be serviced and it may perform method 400 to obtain a normalized ST for that particular master/slave pair. In some cases, the normalized ST may be calculated one or more times and averaged in a suitable manner. In other cases, normalized STs may be averaged for individual masters (each of cores 102) without regard to their slave pairings. In yet other cases, normalized STs may be averaged across two or more masters (e.g., all of cores 102), and an overall value may be used for all bus access requests independently of their master or slave.

In some embodiments, the training operations of method 400 may be repeated periodically, upon the triggering of a specified event (e.g., upon a determination that a GNT signal has been missed by an idle core due to the ST of a higher priority request having been overestimated), and/or upon command of a user. In other embodiments, these training operations may be bypassed, at least in part, in favor of a "design parameters" approach. Specifically, when an integrated circuit such as circuit 200 is being designed, its STs (e.g., for each master/slave combination, for each master, and/or for all masters) may be derived based on the circuit's design parameters (e.g., time duration of a memory access operation, etc.), for instance, as determined by a software application.

Figure 5:
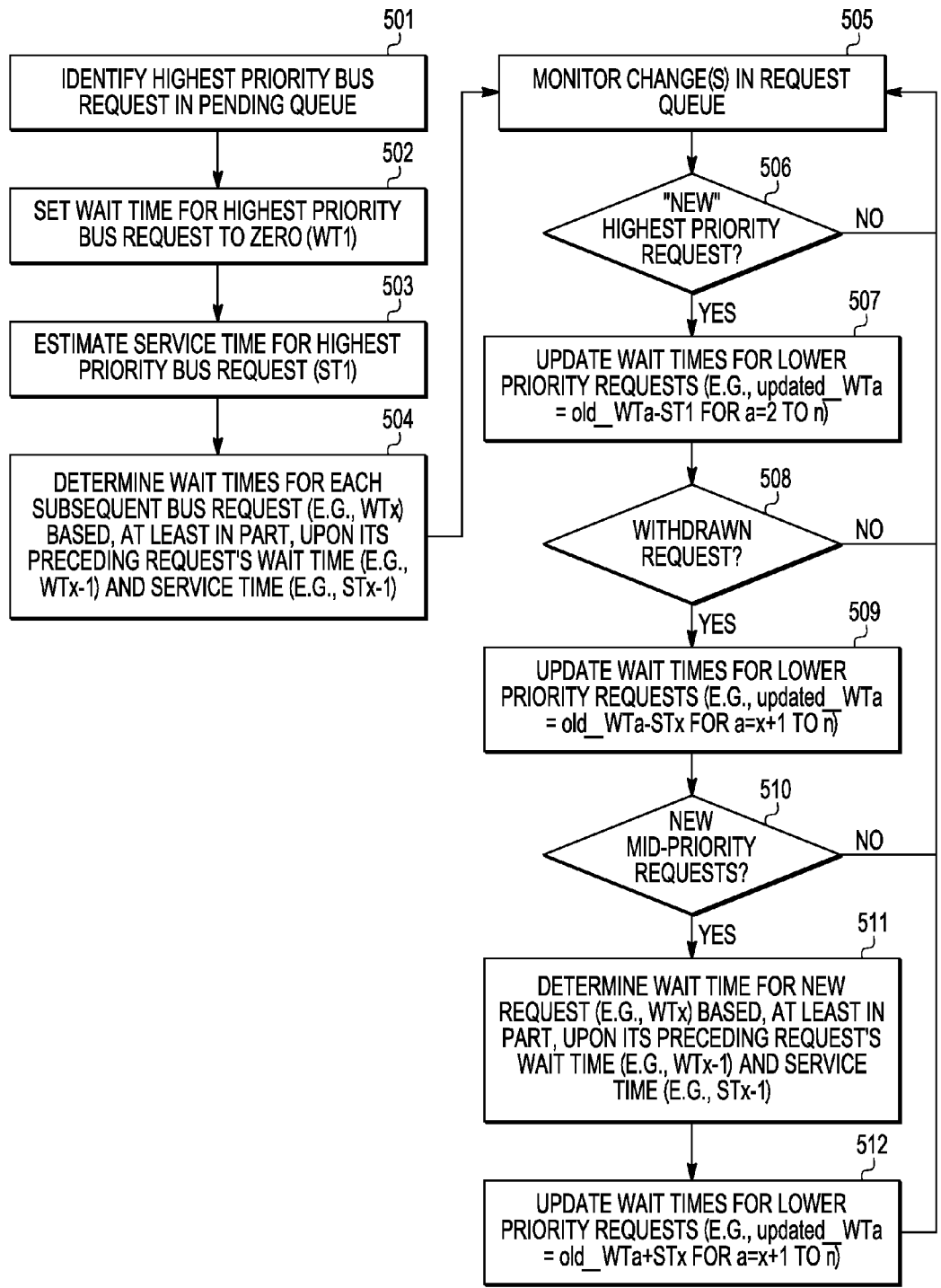
FIG. 5 is a flowchart of a method of calculating wait times for bus access requests, according to some embodiments.

FIG. 5 is a flowchart of a method of calculating wait times (WTs) for bus requests. In some embodiments, method 500 may be performed, at least in part, by prediction circuit 204 of system arbiter 104 shown in FIG. 2 and as part of block 303 in FIG. 3. As illustrated, method 500 may identify a highest priority bus access request currently pending at block 501. For example, prediction circuit 204 may retrieve the top entry in pending queue 202 and/or prediction memory 205. Then, at block 502, prediction circuit 204 may set the wait time for the highest priority bus access request to zero, which indicates that the highest priority request does not need to wait for the completion of any other request before it is granted access to bus 101. At block 503, method 500 estimates the service time of the highest priority bus access request ($ST_1$). For example, prediction circuit 204 may retrieve a previously stored normalized service time for the highest priority core at issue, and it may multiply that normalized value by a magnitude of the pending request.

At block 504, method 500 may determine wait times for subsequent bus requests based upon preceding (i.e., higher priority) requests' wait times and/or service times. For example, as noted above, the wait time ($WT_1$) of the highest priority bus access request ($R_1$) in queue 202 is set to zero: $WT_1=0$. Thus, the estimated wait time ($WT_2$) for the second highest priority request ($R_2$) in queue 202 may be given by $WT_1+ST_1=ST_1$. More generally, however, $WT_x=WT_{x-1}+ST_{x-1}$, where "x" is the number of bus access request ($R_x$) ordered in queue 202. In other words, the wait time of a given bus access request is equal to the wait time of an immediately higher priority request plus the service time of that higher priority bus access request. In some implementations, prediction circuit 204 may maintain in prediction memory 205 a table of wait times and/or service times for each bus access request similar to that shown in Table I below:

TABLE I

| Order in Queue (Priority) | Bus Access Request | Wait Time | Service Time |
|---|---|---|---|
| 1 | $R_1$ | 0 | $ST_1$ |
| 2 | $R_2$ | $WT_2 = ST_1$ | $ST_2$ |
| 3 | $R_3$ | $WT_3 = WT_2 + ST_2$ | $ST_3$ |
| ... | ... | ... | ... |
| x − 1 | $R_{x-1}$ | $WT_{x-1} = WT_{x-2} + ST_{x-2}$ | $ST_{x-1}$ |
| x | $R_x$ | $WT_x = WT_{x-1} + ST_{x-1}$ | $ST_x$ |
| ... | ... | ... | ... |
| n | $R_n$ | $WT_n = WT_{n-1} + ST_{n-1}$ | $ST_n$ |

At block 505, method 500 monitors changes in request queue 202. For example, prediction circuit 204 may inspect queue 202 periodically and/or it may receive a REQ signal from one of cores 102 indicating a newly issued bus access request. At block 506, method 500 determines whether a "new" highest priority bus access request is now pending. For example, a previously highest priority request may have been satisfied thus causing a second highest priority request to become the highest priority request in queue 202. Alternatively, a new request may arrive at arbiter circuit 201 having a priority higher than any other request pending in queue 202. If there is no modification to the highest priority position in queue 202, control returns to block 505. Otherwise, at block 507, method 500 updates wait times for lower priority requests. For example, the service time of the preceding highest priority request may be subtracted from each stored wait time: updated_$WT_a$=old_$WT_a$−$ST_1$, for a=2 to n. Alternatively, wait time calculations may be performed anew for each pending request.

At block 508, method 500 determines whether a pending bus access request has been withdrawn from queue 202. If not, control returns to block 505. Otherwise, at block 509, wait times for bus access requests having a priority lower than the withdrawn request in queue 202 may have their access times recalculated. For example, if the withdrawn request is $R_x$, then updated_$WT_a$=old_$WT_a$−$ST_x$, for a=x+1 to n. Here it should be noted that, in a typical situation, a higher-priority request in queue 202 generally has its wait time unaffected by the withdrawal of a lower priority request. Alternatively, wait time calculations may be performed anew for each pending request.

At block 510, method 500 determines whether a new bus access request has arrived at arbiter circuit 201 having a priority higher than at least one other request pending in queue 202, but lower than another such request (i.e., a "mid-priority" request). If not, control returns to block 505. Otherwise, at block 511, method 500 determines the wait time for the newly arriving request ($WT_x$) based, at least in part, upon its immediately preceding request's (in order of priority within queue 202) wait time ($WT_{x-1}$) and service time ($ST_{x-1}$) ($WT_x=WT_{x-1}+ST_{x-1}$). Then, a block 512, method 500 calculates wait times for lower priority requests as: updated_$WT_a$=old_$WT_a$+$ST_x$, for a=x+1 to n, and control returns to block 505.

It should be understood that the various operations described herein, particularly in connection with FIGS. 3-5, may be implemented in software executed by processing circuitry, hardware, or a combination thereof. The order in which each operation of a given method is performed may be changed, and various elements of the systems illustrated herein may be added, reordered, combined, omitted, modified, etc. It is intended that the invention(s) described herein embrace all such modifications and changes and, accordingly, the above description should be regarded in an illustrative rather than a restrictive sense.

Figure 6:
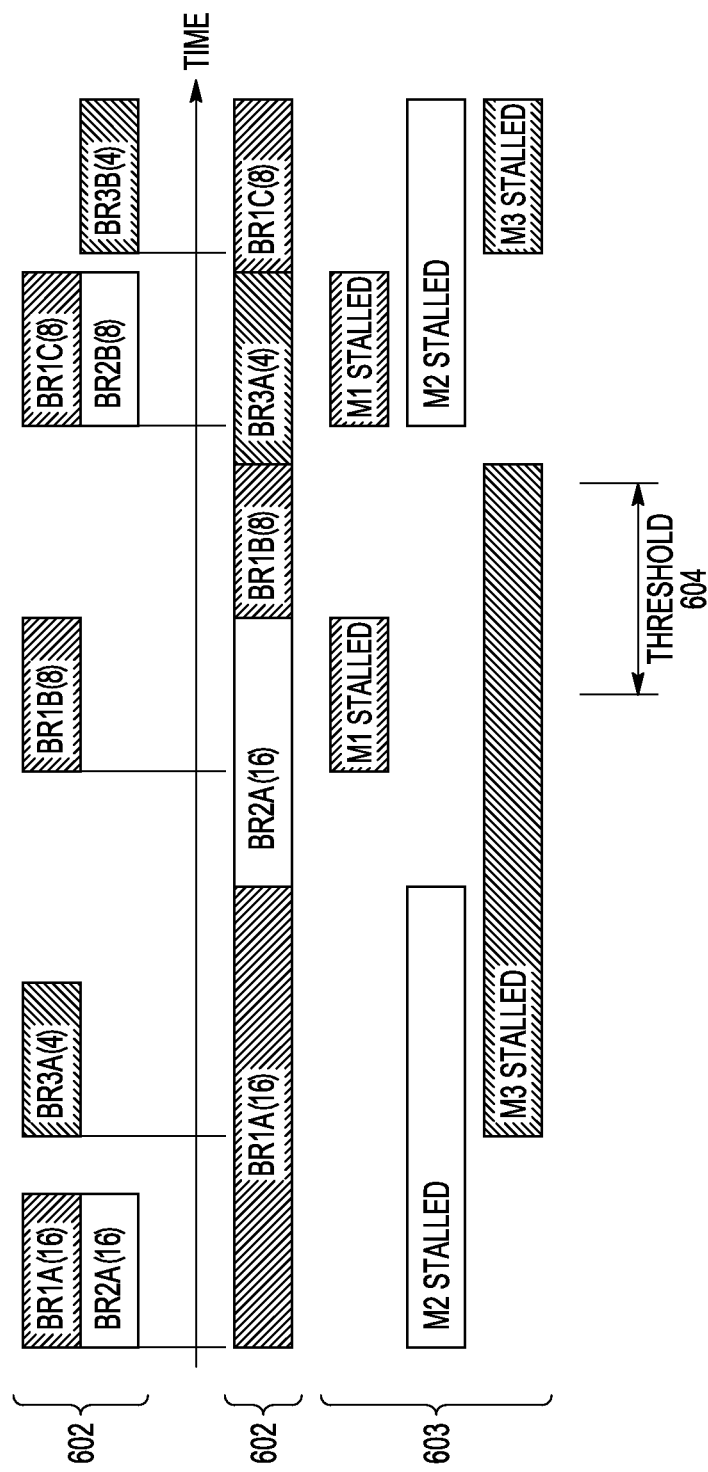
FIG. 6 is a chart illustrating an example of component behavior prediction, according to some embodiments.

To further illustrate the foregoing, FIG. 6 shows an example of behavior prediction. In some embodiments, such behavior prediction may result from an implementation of a system such as shown in FIG. 2 executing one or more operations shown in FIGS. 3-5. In this example, let there be three cores or master components M1, M2, and M3, where M1 has a priority "1," M2 has a priority "2" (i.e., lower than M1), and M3 has a priority "3" (i.e., lower than M2). At different times, M1 transmits three bus access requests A, B, and C to arbiter circuit 203 and denoted by "BR1A," "BR1B," and "BR1C," respectively. M2 transmits two bus access requests A and B to arbiter circuit 203 represented by "BR2A" and "BR2B," and M3 also transmits its own two bus access requests A and B denoted by "BR3A" and BR3B."

Also, in this example, the number between parenthesis (e.g., BR1A(X)) represents the amount of data involved in the requested transfer and/or the magnitude of the request (e.g., X bytes, kilobytes, etc.). Bracket 601 in graph 600 shows the arrival times of each REQ signal corresponding to these various bus access requests, bracket 602 shows the request that is actually occupying the bus at a given time (i.e., the winner of the arbitration), and bracket 603 shows the master components that are stalled or idle because their requests are pending in queue 202. The length of each element in 602 indicates the service time of the request being executed, and the length of each element in 603 indicates the wait time of each queued request. Moreover, for sake of illustration, threshold 604 used in block 304 of FIG. 3 is provided. It should be noted that, although only one threshold is used in this example for simplicity of explanation, in other embodiments two or more different threshold values may be used (e.g., one for each master component M1-M3, one for each type of bus access request, etc.).

Turning to the elements shown in brackets 601 and 602, a brief description of how arriving requests are queued and granted is provided. Here, BR1A(16) and BR2A(16) arrive at the arbiter circuit at the same time, or are otherwise both pending in the request queue at the same time. Accordingly, because BR1A(16) has a higher priority than BR2A(16), arbiter circuit 203 grants bus access to M1 in order to fulfill BR1A(16), and retains BR2A(16) in the top position within the request queue. While BR1A(16) is being fulfilled at 602, another request BR3A(4) arrives at 601. Because BR3A(4) has a lower priority than BR2A(16), it is stored in the second position within the queue. When BR1A(16) terminates and the bus is released, the bus is granted to M2 in order to fulfill BR2A(16) and BR3A(4) moves from the second to the first position in the queue. During execution of BR2A(16), request BR1B(8) arrives. Although BR1B(8) has a higher priority than BR2A(16), M2 is already using the bus; therefore BR1B(8) is placed in the queue. However, because BR1B(8) has a higher priority than BR3A(4), it occupies the first position and BR3A(4) returns to the second position in the queue. When BR2A(16) terminates and the bus is released, the bus is granted to M1 in order to fulfill BR1B(8), and BR3A(4) again moves to the first position in the queue. When BR1B(8) terminates and the bus is released, M3 obtains access to the bus to fulfill BR3A(4) and queue 202 stays empty until BR1C(8) and BR2B(8) arrive, at which point both are placed in the queue ordered by their respective priorities. Once BR3A(4) terminates and the bus is released, M1 receives access to the bus to fulfill BR1C(8) and BR2B(8) moves up to the first position in the queue. While M1 is using the bus, BR3B(4) arrives and is placed in second position after BR2B(8) due to its lower priority.

Using the technique shown in FIGS. 3-5, prediction circuit 204 may estimate the wait time of BR2A(16) to be equal to the service time of BR1A(16). Here, because the wait time of BR2A(16) is greater than threshold 604, prediction circuit 204 may transmit a message to M2 indicating its expected wait time so that M2 may take power saving actions, or directly instructing M2 to enter a power saving mode, for example. When BR3A(4) arrives, its arrival does not affect the wait time of BR2A(16). The wait time of BR3A(4) may be calculated, however, as the remaining wait time of BR2A(16) plus the expected service time of BR2A(16). Again, because the wait time of BR3A(4) is greater than threshold 604, prediction circuit 204 may transmit a message to M3 indicating its expected wait time so that M3 may take power saving actions, or directly instructing M3 to enter a power saving mode.

When BR1B(8) arrives, it is placed higher in the queue than BR3A(4). Accordingly, the wait time for BR3A(4) may be recalculated as the wait time of BR1B(8) (i.e., the remaining service time of BR2A(16)) plus its service time. Because the wait time of BR1B(8) is less than threshold 604, prediction circuit 204 does not notify M1 of the wait time. However, because the updated wait time of BR3A(4) is still greater than the threshold value, prediction circuit 204 may transmit another message to M3 indicating the updated wait time so that M3 may continue to take power saving actions or the like.

When BR1C(8) and BR2B(8) arrive, the wait time of BR1C(8) is determined to be the remaining portion of the service time of BR3A(4), and the wait time of BR2B(8) is calculated as the wait time of BR1C(8) plus its expected service time. Here again, because the wait time of BR1C(8) is smaller than 604, M1 does not get a notification from prediction circuit 204, but because the wait time of BR2B(8) is greater than threshold 604, prediction circuit 204 may transmit a message to M2 with its wait time or with a power save command. Finally, when BR3B(4) arrives, its wait time is calculated as the current wait time of BR2B(8) plus its expected service time, and a message may be transmitted to M3 if that wait time meets threshold 604.

Therefore, by dynamically predicting the behavior of different components coupled to a bus, various power and/or performance improvements and/or optimizations may be implemented at runtime. For example, by predicting that a memory or a core will be idle for some period of time, its power and/or performance may be managed accordingly. Because a system arbiter controls access to its bus, it knows which component is accessing the bus and which component(s) have their requests waiting in queue. Using one or more of the techniques discussed herein, the system arbiter may also know the number of clock cycles or length of time that it will take for a pending request to be serviced. Thus, it becomes possible to determine which requests will be pending and for how long, which may be analyzed to predict the stall of both memories and processing elements in an integrated circuit or computing system, and which may in turn be used to perform power control or performance enhancement operations.

In an illustrative, non-limiting embodiment, an electronic system may include bus arbitration circuitry configured to identify a bus access request associated with a component operably coupled to a bus, calculate a wait time corresponding to the bus access request and indicative of a length of time after which the component is expected to be granted access to the bus, and transmit a message to the component in response to the wait time meeting a predetermined value. In some implementations, the component may be one of a plurality of electronic circuits operably coupled to the bus, and the bus access request may indicate a priority of the electronic circuit relative to another one of the plurality of electronic circuits.

The bus access request may be one of a plurality of bus access requests pending in a request queue, each of the plurality of bus access requests ordered in the request queue by their respective priorities. Additionally or alternatively, the bus access request may indicate a lower priority than another bus access request pending in a request queue and associated with the other one of the plurality of electronic circuits, and the wait time may be equal to another wait time corresponding to the other bus access request plus a service time indicative of a length of time after which the other one of the plurality of electronic circuits is expected to release the bus once the other bus access request is granted.

The bus arbitration circuitry may also be configured to identify the service time based, at least in part, upon one or more design parameters of the electronic system. For example, the one or more design parameters may include a duration of a memory access operation. Moreover, the bus arbitration circuitry may be further configured to perform a training operation to determine the service time, and the message may include at least one of: an indication of the wait time or a power saving instruction.

In some embodiments, the bus access request may be one of a plurality of bus access requests stored in a request queue, each of the bus access requests associated with a respective one of a plurality of components operably coupled to the bus. The bus arbitration circuitry may be further configured to calculate wait times for each of the plurality of components, each of the wait times indicative of a time by which a respective one of the plurality of components is expected to be granted access to the bus, the wait time for a given one of the plurality of components calculated based, at least in part, upon a service time of another one of the plurality of components having a higher priority than the given one of the plurality of components.

For example, the service time may be equal to a time by which the other one of the plurality of components is expected to release the bus once its respective bus access request is granted. As such, the bus arbitration circuitry may be configured to identify a length of time expended between a grant of a previous bus access request and bus release involving the other one of the plurality of components, divide the length of time by a magnitude of the previous bus access request to calculate a normalized service time, and multiply the normalized service time by a magnitude of a current bus access request to calculate the service time. The normalized service time may be aggregated across two or more of the plurality of components. Additionally or alternatively, the normalized service time may be associated with a combination of the other one of the plurality of components and one of a plurality of slave components.

In another illustrative, non-limiting embodiment, a method performed by bus arbitration circuitry may include identifying a first bus access request pending in a request queue, the first bus access request associated with a first master component operably coupled to a bus, calculating a first wait time corresponding to the first bus access request, the first wait time indicative of a length of time after which the first master component is expected to be granted access to the bus, and, in response to the first wait time meeting a threshold value, issuing a command to the first master component.

In some cases, calculating the first wait time may include adding, to a second wait time corresponding to a second bus access request associated with a second master component operably coupled to the bus, a service time indicative of a length of time by which the second master component is expected to release the bus after the second bus access request has been granted, where the second master component has a priority higher than the first master component. For example, the second master component may have been granted access to the bus prior to the first bus access request having been added to the request queue, and the second wait time may be equal to zero.

The method may also include determining that a third bus access request associated with a third master component operably coupled to the bus has been added to the request queue, the third master component having a priority higher than the first master component and lower than the second master component, and re-calculating the first wait time in response to the determination. For instance, re-calculating the first wait time may include calculating a third wait time corresponding to the third bus access request, the third wait time indicative of a length of time after which the third master component is expected to be granted access to the bus after the second bus master component is expected to release the bus, and adding the third wait time to a service time indicative of a length of time by which the third master component is expected to release the bus after the third bus access request has been granted.

The method may further include determining that the second bus access request has been removed to the request queue, and re-calculating the first wait time in response to the determination. For example, re-calculating the first wait time may include adding, to a third wait time corresponding to a third bus access request associated with a third master component operably coupled to the bus, the third master component having a priority higher than the second master component, a service time indicative of a length of time by which the third master component is expected to release the bus after the third bus access request has been granted.

Although the invention(s) is/are described herein with reference to specific embodiments, various modifications and changes can be made without departing from the scope of the present invention(s), as set forth in the claims below. For example, although presented in the context of integrated circuits, various systems and methods described herein may be implemented in electronic systems having discrete components. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The term "coupled" is defined as connected, although not necessarily directly, and not necessarily mechanically. The terms "a" and "an" are defined as one or more unless stated otherwise. The terms "comprise" and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An electronic system, comprising:
bus arbitration circuitry configured to
identify a first bus access request associated with a first component operably coupled to a bus,
calculate a first wait time corresponding to the first bus access request and indicative of a length of time after which the first component is expected to be granted access to the bus, wherein the first wait time is equal to a second wait time corresponding to a second bus access request associated with a second component operably coupled to the bus plus a service time indicative of a length of time by which the second component is expected to release the bus after the second bus access request has been granted, wherein the first bus access request indicates a lower priority than the second bus access request, wherein the first component comprises a first electronic circuit of a plurality of electronic circuits operably coupled to the bus, the second component comprises a second electronic circuit of the plurality of electronic circuits, and the first bus access request indicates a priority of the first electronic circuit relative to the second electronic circuit, and
transmit a message to the first component in response to the wait time meeting a predetermined value.

2. The electronic system of claim 1, wherein the first bus access request is one of a plurality of bus access requests pending in a request queue, each of the plurality of bus access requests ordered in the request queue by their respective priorities.

3. The electronic system of claim 1, wherein the bus arbitration circuitry is further configured to identify the service time based, at least in part, upon one or more design parameters of the electronic system.

4. The electronic system of claim 3, wherein the one or more design parameters includes a duration of a memory access operation.

5. The electronic system of claim 1, wherein the bus arbitration circuitry is further configured to perform a training operation to determine the service time.

6. The electronic system of claim 1, wherein the message includes at least one of: an indication of the wait time or a power saving instruction.

7. The electronic system of claim 1, wherein the first bus access request is one of a plurality of bus access requests stored in a request queue, each of the bus access requests associated with a respective one of a plurality of components operably coupled to the bus, the bus arbitration circuitry further configured to calculate respective wait times for each of the plurality of components, each of the respective wait times indicative of a time by which a respective one of the plurality of components is expected to be granted access to the bus, the respective wait time for a given one of the plurality of components calculated based, at least in part, upon a respective service time of another one of the plurality of components having a higher priority than the given one of the plurality of components.

8. The electronic system of claim 7, wherein the respective service time is equal to a time by which the other one of the plurality of components is expected to release the bus once its respective bus access request is granted.

9. The electronic system of claim 7, wherein the bus arbitration circuitry is further configured to identify a length of time expended between a grant of a previous bus access request and bus release involving the other one of the plurality of components, divide the length of time by a magnitude of the previous bus access request to calculate a normalized service time, and multiply the normalized service time by a magnitude of a current bus access request to calculate the service time.

10. The electronic system of claim 9, wherein the normalized service time is aggregated across two or more of the plurality of components.

11. The electronic system of claim 10, wherein the normalized service time is associated with a combination of the other one of the plurality of components and one of a plurality of slave components.

12. A method performed by bus arbitration circuitry, the method comprising:
identifying a first bus access request pending in a request queue, the first bus access request associated with a first master component operably coupled to a bus;
calculating a first wait time corresponding to the first bus access request, the first wait time indicative of a length of time after which the first master component is expected to be granted access to the bus, wherein
the calculating the first wait time comprises adding, to a second wait time corresponding to a second bus access request associated with a second master component operably coupled to the bus, a service time indicative of a length of time by which the second master component is expected to release the bus after the second bus access request has been granted, wherein the second master component has a priority higher than the first master component; and
in response to the first wait time meeting a threshold value, issuing a command to the first master component.

13. The method of claim 12, wherein the second master component has been granted access to the bus prior to the first bus access request having been added to the request queue, and wherein the second wait time is equal to zero.

14. The method of claim 12, further comprising determining that a third bus access request associated with a third master component operably coupled to the bus has been added to the request queue, the third master component having a priority higher than the first master component and lower than the second master component, and re-calculating the first wait time in response to the determination.

15. The method of claim 14, wherein re-calculating the first wait time includes calculating a third wait time corresponding to the third bus access request, the third wait time indicative of a length of time after which the third master component is expected to be granted access to the bus after the second bus master component is expected to release the bus, and adding the third wait time to a service time indicative of a length of time by which the third master component is expected to release the bus after the third bus access request has been granted.

16. The method of claim 12, further comprising determining that the second bus access request has been removed to the request queue, and re-calculating the first wait time in response to the determination.

17. The method of claim 16, wherein re-calculating the first wait time includes adding, to a third wait time corresponding to a third bus access request associated with a third master component operably coupled to the bus, the third master component having a priority higher than the second master component, a service time indicative of a length of time by which the third master component is expected to release the bus after the third bus access request has been granted.

\* \* \* \* \*